United States Patent Office 3,833,667
Patented Sept. 3, 1974

3,833,667
PROCESS FOR THE PREPARATION OF 1,2-DI-(o-
OR p-NITROPHENYL)-ETHANOL
Jan Magnus Bakke, Trondheim, Norway, assignor to
Aktiebolaget Bofors, Bofors, Sweden
No Drawing. Filed Jan. 10, 1972, Ser. No. 216,759
Claims priority, application Sweden, Feb. 1, 1971,
1,220/71
Int. Cl. C07c 31/14
U.S. Cl. 260—618 C    10 Claims

ABSTRACT OF THE DISCLOSURE 1,2-di-(o- or p-nitrophenyl)-ethanol may be prepared by oxidation of o-nitrotoluene and p-nitrotoluene, respectively, in high concentrations with oxygen in an aprotic, polar, cation-solvating solvent under basic conditions.

BACKGROUND OF THE INVENTION

The present invention relates to a novel process for the preparation of 1,2-di-(o- or p-nitrophenyl)-ethanol.

Those compounds which are valuable intermediates for the preparation of drugs, dyestuffs etc. could previously be prepared according to Swed. Pat. Appln. 8,399/67 by addition of o-(or p-)-nitrobenzaldehyde to o-nitrotoluene (ONT) and p-nitrotoluene (PNT), respectively. This, however, will require a supply of the nitrobenzaldehyde which is a rather expensive starting material.

SUMMARY OF THE INVENTION

According to the present invention I have now found that 1,2-di-(o- or p-nitrophenyl)-ethanol may be prepared easily and in good yields by oxidation of ONT and PNT, respectively, in high concentrations in an aprotic, polar, cation-solvating solvent under alkali hydroxide basic conditions.

The solvent may be e.g. dimethyl-sulphoxide (DMSO), dimethyl-formamide (DMF), dimethylacetamide, hexamethylphosphotriamide and tetramethyl urea and other solvents of this type being aprotic, polar and cation-solvating.

The concentration of ONT and PNT, respectively, in the solvent should be at least 0.5 mole/liter and is preferably kept above 1 mole/liter. The oxidation temperature should suitably be from about −20 to about 40° C.

It has previously been known to oxidize ONT and PNT by means of oxygen. However, previous attempts with this oxidation under other conditions than those according to the invention have given varying results. Thus oxidation of PNT in methanol (H. O. I. House, Organic Synthesis, Coll. Vol. IV, S 367, Wiley, New York, 1963) has given p,p'-dinitrobibenzyl. If the oxidation is carried out in DMSO with a low concentration (about 0.36 mole/liter) of PNT one will obtain p,p'-dinitrostilbene (G. A. Russell et al., J. Org. Chem. 32 (1967), p. 137). Therefore, it is surprising that the process according to the invention will give 1,2-di-(o- or p-nitrophenyl)-ethanol instead of the expected dinitrostilbenes.

The invention will be explained in greater detail with reference to the following concrete working examples, which, however, do not limit the scope of protection.

EXAMPLE 1

Oxygen gas is fed through a solution of 26 g. of ONT in 141 ml. of DMF and 2.1 g. of potassium hydroxide dissolved in 10 ml. of ethanol is added. The oxidation is continued for 3.5 hours at −10° C. The reaction mixture is thereafter poured into water and is extracted 3 times with ether. The ether phase is washed with water, dried over $Na_2SO_4$ and evaporated. 3.7 g. of 1,2-di-(o-nitrophenyl)-ethanol is crystallized. This substance has a melting point of 153–55° C. and its IR-spectrum (KBr) shows absorption at 3550, 3060, 2950, 2860, 2840, 1610, 1580, 1520, 1450, 1360, 1340, 1310, 1050, 1040, 860, 790, 780, 740, 710, 700, 660 cm.$^{-1}$. The structure is further proved by means of mass spectra (mole weight 288) and by means of the preparation of derivatives (ketone and acetate). Analysis of the mother liquor by means of gas chromatography indicates that 10.0 g. of ONT has reacted. The yield of 1,2-di-(o-nitrophenyl)-ethanol is thus 35% of the reacted amount ONT.

EXAMPLE 2

A solution of 46 g. of ONT in 160 ml. of DMSO with 10 g. of KOH-pearls is oxidized with oxygen gas under stirring for three hours. The temperature is maintained at about 25–30° C. The reaction mixture is poured into water and the unreacted ONT and 1,2-di-(o-nitrophenyl)-ethanol is recovered by means of extraction, followed by distillation and crystallization. 63% of the amount of ONT has reacted and the yield of 1,2-di-(o-nitrophenyl)-ethanol is 37% as calculated on the reacted amount of ONT.

EXAMPLE 3

Oxygen gas is fed through a solution of 46 g. of PNT in 160 ml. of DMSO containing 10 g. of KOH-pearls. During the oxidation the mixture is stirred and the temperature is maintained at about 35–40° C. After three hours the mixture is poured into water and unreacted PNT and 1,2-di-(p-nitrophenyl)-ethanol is recovered by means of filtration. Unreacted PNT is separated by means of washing with chloroform and the desired product is purified by means of recrystallization from chloroform. 65% of the amount of charged PNT has reacted and the yield of 1,2-di-(p-nitrophenyl)-ethanol is 40% as calculated on the amount of reacted PNT. The obtained 1,2-di-(p-nitrophenyl)-ethanol has a melting point of 184–86° C. and its IR-spectrum shows absorption at 3530, 3100, 3080, 2960, 2920, 2890, 2840, 1610, 1600, 1520, 1350, 1210, 1160, 865, 855, 790, 750, 700 cm.$^{-1}$. The structure is also proved by means of mass spectra (mole weight 288) and preparation of derivatives (ketone and acetate).

In a comparative test series I found that an oxidation as carried out according to conditions as mentioned in the above publication by Russel et al., gave exactly the results as described in the publication.

What is claimed is:

1. A process for the preparation of 1,2-di-(o- or p-nitrophenyl)-ethanol whereby o- or p-nitrotoluene is oxidized with oxygen at a temperature of from −20 to +40° C. in a solvent selected from the group consisting of dimethyl sulphoxide, dimethyl formamide, dimethyl acetamide, hexamethyl phosphotriamide, and tetramethyl urea and in the presence of an alkali hydroxide and wherein the concentration of o- or p-nitrotoluene in said solvent is about 1 mole/liter.

2. The process of claim 1 wherein o-nitrotoluene is oxidized.

3. The process of claim 1 wherein p-nitrotoluene is oxidized.

4. A process according to claim 1, where the solvent is dimethyl-sulphoxide.

5. A process according to claim 1, where the solvent is dimethyl-formamide.

6. A process according to claim 1, where the solvent is dimethylacetamide.

7. A process according to claim 1, where the solvent is hexamethylphosphotriamide.

8. A process according to claim 1, where the solvent is tetramethyl urea.

9. The process of claim 1 wherein said alkali hydroxide is potassium hydroxide.

10. The process of claim 9 wherein said solvent is dimethyl sulphoxide.

References Cited

Chem. Abstracts, 73, 98070c (1970).

LEON ZITVER, Primary Examiner

D. B. SPRINGER, Assistant Examiner